United States Patent
Binder et al.

(10) Patent No.: US 12,322,812 B1
(45) Date of Patent: Jun. 3, 2025

(54) FUEL CELL ELECTRODE, CATALYST-COATED MEMBRANE, FUEL CELL, AND METHOD FOR PRODUCING THE FUEL CELL ELECTRODE AND CATALYST-COATED MEMBRANE

(71) Applicant: Greenerity GmbH, Alzenau (DE)

(72) Inventors: Matthias Binder, Gelnhausen (DE); Aline Jarofski, Geiselbach (DE); Jens-Peter Suchsland, Alzenau (DE)

(73) Assignee: Greenerity GmbH, Alzenau (DE)

( * ) Notice: Subject to any disclaimer, the term of this patent is extended or adjusted under 35 U.S.C. 154(b) by 0 days.

(21) Appl. No.: 18/849,370

(22) PCT Filed: Mar. 15, 2023

(86) PCT No.: PCT/EP2023/056584
§ 371 (c)(1),
(2) Date: Sep. 20, 2024

(87) PCT Pub. No.: WO2023/180134
PCT Pub. Date: Sep. 28, 2023

(30) Foreign Application Priority Data

Mar. 21, 2022 (DE) .................. 10 2022 106 484.0

(51) Int. Cl.
*H01M 4/86* (2006.01)
*H01M 4/88* (2006.01)
*H01M 4/92* (2006.01)
*H01M 8/1004* (2016.01)

(52) U.S. Cl.
CPC ........ *H01M 4/8663* (2013.01); *H01M 4/881* (2013.01); *H01M 4/8825* (2013.01); *H01M 4/92* (2013.01); *H01M 8/1004* (2013.01); *H01M 2004/8684* (2013.01); *H01M 2004/8689* (2013.01)

(58) Field of Classification Search
CPC .................................................. H01M 4/8663
See application file for complete search history.

(56) References Cited

U.S. PATENT DOCUMENTS

| | | | | |
|---|---|---|---|---|
| 2013/0271066 | A1* | 10/2013 | Signorelli | H02J 7/0042 320/107 |
| 2018/0294500 | A1* | 10/2018 | Yang | H01M 8/1004 |
| 2020/0020488 | A1* | 1/2020 | Martini | H01M 50/491 |

(Continued)

FOREIGN PATENT DOCUMENTS

| | | | |
|---|---|---|---|
| DE | 10 2018 002 337 A1 | 10/2018 | |
| EP | 2 704 239 A1 | 3/2014 | |
| EP | 2 452 955 B1 | 12/2016 | |

(Continued)

OTHER PUBLICATIONS

International Search Report dated Jun. 19, 2023, of counterpart International Application No. PCT/EP2023/056584 along with an English translation.

(Continued)

*Primary Examiner* — Brian R OHara
(74) *Attorney, Agent, or Firm* — DLA Piper LLP (US)

(57) ABSTRACT

A fuel cell electrode includes a metal-containing catalyst and a proton-conducting ionomer, wherein the fuel cell electrode has a halide concentration of 50 to 1000 ppm, based on the total mass of the fuel cell electrode.

20 Claims, 3 Drawing Sheets

(56) References Cited

U.S. PATENT DOCUMENTS

2021/0020954 A1* 1/2021 Park .................. H01M 8/1004

FOREIGN PATENT DOCUMENTS

| EP | 3 240 070 A1 | | 11/2017 | |
|----|--------------|---|---------|---|
| JP | 2015195208 A | | 11/2015 | |
| JP | 2015195209 A | | 11/2015 | |
| JP | 2017041384 A | | 2/2017 | |
| KR | 20160008225 A | * | 1/2016 | ............ H01M 4/921 |

OTHER PUBLICATIONS

Guilminot, E. et al., "Detection of $Pt^{z+}$ Ions and Pt Nanoparticles Inside the Membrane of a Used PEMFC," *J. Electrochem. Soc.*, 2007, vol. 154, No. 1, pp. B96-B105.

Yadav, A.P. et al., "Effect of halogen ions on platinum dissolution under potential cycling in 0.5 M $H_2SO_4$ solution," *Electrochimica Acta*, 2007, vol. 52, Issue 26, pp. 7444-7452, Abstract only.

Office Action dated Apr. 15, 2025, from counterpart Japanese Patent Application No. JP2024-555167.

* cited by examiner

FUEL CELL ELECTRODE, CATALYST-COATED MEMBRANE, FUEL CELL, AND METHOD FOR PRODUCING THE FUEL CELL ELECTRODE AND CATALYST-COATED MEMBRANE

CROSS-REFERENCE TO RELATED APPLICATIONS

This application is a US national stage filing under 35 U.S.C. § 371 of International Application No. PCT/EP2023/056584, filed Mar. 15, 2023, which claims priority to German Patent Application No. 10 2022 106 484.0, filed Mar. 21, 2022, each of which is incorporated herein by reference in its entirety.

TECHNICAL FIELD

This disclosure relates to a fuel cell electrode, a catalyst-coated membrane, a fuel cell, and a method for producing the fuel cell electrode and also a method for producing the catalyst-coated membrane.

BACKGROUND

It is known that halide ions, and of these in particular chloride ions, can reduce the functionality or long-term stability of a membrane electrode assembly for fuel cells. In this case, halide ions can be introduced into the membrane electrode assembly in various ways, for example, by using halide-containing precursors for the catalysts to be used in the electrodes of the membrane electrode assembly, such as $H_2Pt(Cl)_6$ and the like.

Under real operating conditions, the MEA pass through potential cycles, i.e. alternating phases of higher and lower potentials. In such a case, repeated reduction and oxidation of the catalysts in the fuel cell electrodes takes place, in particular of the often-used platinum on the cathode side of the MEA. This in turn leads to repeated dissolution and deposition of the platinum, as a result of which individual catalyst particles can agglomerate, which is known under the term "Ostwald ripening", as a result of which the catalyst surface reduces, and thus performance is lost, over the course of operation.

Guilminot et al. (J. Electrochem. Soc. 2007, 154 (1), B96-B105) report of halide contamination of a catalyst based on platinum and carried on carbon (Pt/C-), and a resulting reduced catalytic activity. It is also noted that adsorbed halides promote the (electro) chemical dissolution of Pt or PtO.

Halogenated intermediates in the preparation of perfluorinated polymers, which are used, for example, in the fuel cell membrane and as ionomers in fuel cell electrodes, are described, for example, in DE102018002337 A1 as a cause of halide contamination. The effect of increased platinum dissolution by chloride or bromide is mentioned in DE102018002337 A1 and in Electrochimica Acta 52 (2007): 7444-7452, cited therein, wherein a very small portion of approx. 1 ppm is already described as negative. A chloride concentration of 4 ppm allegedly already leads to a voltage loss of 50 mV. Furthermore, chlorides can result in increased formation of $H_2O_2$, which causes chemical degradation and thus leads to thinning or hole formation in the membrane. DE102018002337 A1 therefore provides a method for improving the long-term stability of an MEA, in which the quantity of halide ions is reduced by addition of silver carbonate, formation of silver halide, and subsequent illumination and thus decomposition of the silver halide, with release of the halogen.

It could therefore be helpful to provide a fuel cell electrode, a catalyst-coated membrane, and also a fuel cell having improved long-term stability, which are not subject to any performance degradation when used as intended. It could also be helpful to specify a method for producing a long-term stable fuel cell electrode and long-term stable catalyst-coated membrane, and also fuel cells, which can be implemented easily and cost-effectively and improve the long-term stability of the fuel cell electrode, and thus also the long-term stability of the catalyst-coated membrane and of the fuel cell, without leading to performance degradation.

SUMMARY

The clauses below describe some aspects of this disclosure:

Clause 1. Fuel cell electrode (2, 3) comprising a metal-containing catalyst (5, 7) and a proton-conducting ionomer (6, 8), wherein the fuel cell electrode (2, 3) has a halide concentration of 150 to 6000 ppm, based on the total mass of the fuel cell electrode (2, 3).

Clause 2. Fuel cell electrode (2, 3) according to clause 1, wherein the fuel cell electrode (2, 3) has a halide concentration of 300 to 3000 ppm, based on the total mass of the fuel cell electrode (2, 3), and/or wherein the halide is selected from the group consisting of fluoride, chloride, bromide, iodide and mixtures thereof, and is preferably chloride.

Clause 3. Fuel cell electrode (2, 3) according to either of the preceding clauses, wherein the metal-containing catalyst (5, 7) comprises a noble metal, or mixtures or alloys of two or more noble metals, or a noble metal/non-noble metal alloy, wherein the noble metal/non-noble metal alloy in particular comprises a platinum alloy, and/or wherein in particular the noble metal of the metal-containing catalyst (5, 7) comprises platinum and/or palladium.

Clause 4. Fuel cell electrode (2, 3) according to any of the preceding clauses, configured as a cathode (2).

Clause 5. Catalyst-coated membrane (1), comprising a fuel cell electrode (2, 3) according to any of the preceding clauses.

Clause 6. Method for producing the fuel cell electrode (2, 3) according to any of clauses 1 to 4, wherein a halide concentration is added to the fuel cell electrode (2, 3) in such a way that the halide concentration of the fuel cell electrode (2, 3) is 150 to 6000 ppm, preferably 300 to 3000 ppm, based on the total mass of the fuel cell electrode (2, 3).

Clause 7. Method according to clause 6, wherein the fuel cell electrode (2, 3) is produced with a solution that contains at least one halide.

Clause 8. Method according to either clause 6 or clause 7, wherein the fuel cell electrode (2, 3) is produced as an anode (3) from an anode dispersion, or as a cathode (2) from a cathode dispersion, wherein a halide-containing compound is added to the anode dispersion or the cathode dispersion, wherein the halide weight portion FA in the anode dispersion fulfils the following formula: ) wherein A is 150 to 6000 ppm and preferably 300 to 3000 ppm, and B is the solids content of the anode dispersion, or wherein the halide weight portion FK in the cathode dispersion fulfils the following formula: ) wherein A is 150 to 6000 ppm and preferably 300 to 3000 ppm, and B is the solids content of the cathode dispersion, wherein the anode dispersion and the cathode dispersion can have different halide weight portions, and/or wherein a cation of a halide-containing compound is selected from the group of protons, alkali metals, alkaline earth metals, an ammonium ion, or cationic organic compounds, and/or wherein for producing the fuel cell electrode (2, 3) a fuel cell electrode dispersion is prepared, in that a metal-containing catalyst (5, 7) and a proton-conducting ionomer (6, 8) are dispersed, and a halide-containing compound is added to the fuel cell electrode dispersion before, during or after the dispersing.

Clause 9. Catalyst-coated membrane comprising a cathode (2), an anode (3), and a proton-conducting membrane (4) located therebetween, wherein (a) the cathode (2) comprises a first metal-containing catalyst (5) and a proton-conducting ionomer (6), (b) the anode (3) comprises a second metal-containing catalyst (7) and a proton-conducting ionomer (8), and (c) the membrane (4) comprises a proton-conducting ionomer, wherein the catalyst-coated membrane (1) has a halide concentration of 50 to 1000 ppm, based on the total mass of the catalyst-coated membrane (1). Clause 10. Catalyst-coated membrane (1) according to clause 9, wherein the catalyst-coated membrane (1) has a halide concentration of 50 to 500 ppm, based on the total mass of the catalyst-coated membrane (1), and/or wherein the halide is selected from the group consisting of fluoride, chloride, bromide, iodide and mixtures thereof, and is preferably chloride, and/or wherein the first metal-containing catalyst (5) and the second metal-containing catalyst (7) comprises a noble metal, or mixtures or alloys of two or more noble metals, or a noble metal/non-noble metal alloy, wherein in particular the noble metal/non-noble metal alloy comprises a platinum alloy, and/or wherein in particular the noble metal of the second metal-containing catalyst (7) comprises platinum and/or palladium.

Clause 11. Catalyst-coated membrane (1) according to either clause 9 or clause 10, wherein the anode (3) has a halide weight portion FA corresponding to the following formula: ) wherein A is 50 to 1000 ppm and preferably 50 to 500 ppm, and MCCM is the areal weight of the catalyst-coated membrane (1), and MCLA is the areal weight of the anode (3), or wherein the cathode (2) has a halide weight portion FK corresponding to the following formula: ) wherein A is 50 to 1000 ppm and preferably 50 to 500 ppm, and MCCM is the areal weight of the catalyst-coated membrane (1), and MCLK is the areal weight of the cathode (2).

Clause 12. Fuel cell comprising a catalyst-coated membrane according to any of clauses 9 to 11. Clause 13. Method for producing the catalyst-coated membrane (1) according to any of clauses 9 to 11, wherein a halide concentration is added to the cathode (2) and/or to the anode (3) and/or to the proton-conducting membrane (4) in such a way that the halide concentration of the catalyst-coated membrane (1) is 50-1000 ppm, preferably 50-500 ppm, based on the total mass of the catalyst-coated membrane (1).

Clause 14. Method according to clause 13, wherein the catalyst-coated membrane (1) is produced with a solution that contains at least one halide, and/or wherein the anode (3) is produced from an anode dispersion and the cathode (2) is produced from a cathode dispersion, wherein a halide-containing compound is added to the anode dispersion and/or to the cathode dispersion, wherein the halide weight portion FA in the anode dispersion fulfils the following formula: ) wherein A is 50 to 1000 ppm and preferably 50 to 500 ppm, B is the solids content of the anode dispersion, and MCCM is the areal weight of the catalyst-coated membrane (1), and MCLA is the areal weight of the anode (3), and/or wherein the halide weight portion FK in the cathode dispersion fulfils the following formula: ) wherein A is 50 to 1000 ppm and preferably 50 to 500 ppm, B is the solids content of the cathode dispersion, and MCCM is the areal weight of the catalyst-coated membrane (1), and MCLK is the areal weight of the cathode (2), wherein the anode dispersion and the cathode dispersion can have different halide weight portions, and/or wherein a cation of a halide-containing compound is selected from the group of protons, alkali metals, alkaline earth metals, an ammonium ion, or cationic organic compounds, and/or wherein an anode dispersion and a cathode dispersion are coated directly onto the membrane (4) or are coated onto the membrane (4) via a decal substrate, and/or wherein for producing the cathode (2) a cathode dispersion is prepared, in that a first metal-containing catalyst (5) and a proton-conducting ionomer (8) are dispersed, wherein for producing the anode (3) an anode dispersion is prepared, in that a second metal-containing catalyst (7) and a proton-conducting ionomer (8) are dispersed, and a halide-containing compound is added to the cathode dispersion and/or to the anode dispersion before, during or after the dispersing.

Figure 1:
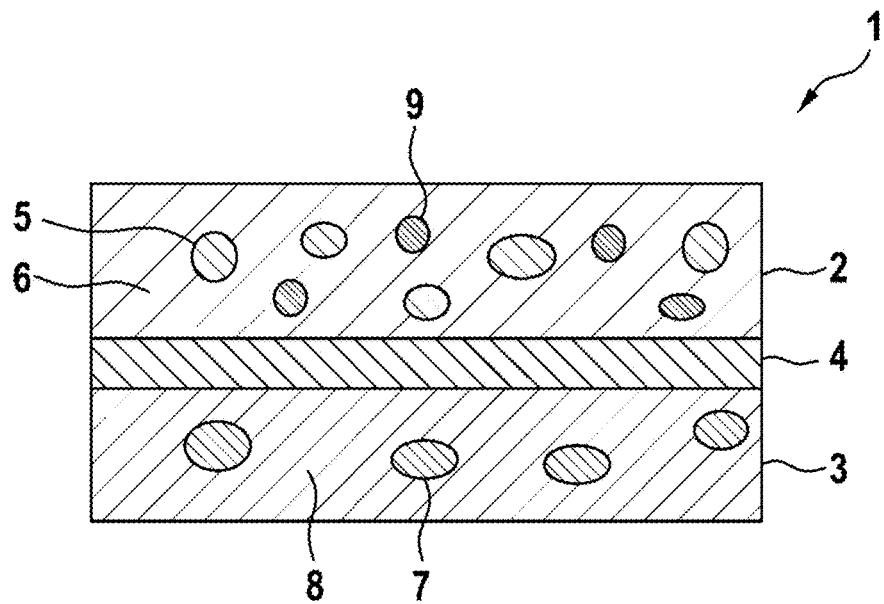
FIG. 1 is a schematic cross section of a catalyst-coated membrane according to an embodiment.

LIST OF REFERENCE SIGNS 1 catalyst-coated membrane
2 cathode
3 anode
4 membrane
5 first metal-containing catalyst
6 proton-conducting ionomer
7 second metal-containing catalyst
8 proton-conducting ionomer
9 halide

DETAILED DESCRIPTION

Our fuel cell electrode comprises a metal-containing catalyst and a proton-conducting ionomer. The fuel cell electrode can be configured as a cathode or as an anode. The fuel cell electrode may also comprise a corresponding metal-containing catalyst, specifically in the case of a cathode an oxygen-reducing metal-containing catalyst (this corresponds, in the catalyst-coated membrane, to the first metal-containing catalyst) and in the case of an anode a hydrogen-oxidising metal-containing catalyst (this corresponds, in the catalyst-coated membrane, to the second metal-containing catalyst). The proton-conducting ionomer of the anode and cathode may be the same or different.

The fuel cell electrode is characterised by a halide concentration of 50 to 1000 ppm, based on the total mass of the fuel cell electrode. This means that active halide ions, for example, in the form of a halide-containing solution, are added to the fuel cell electrode. Any amounts of halide already contained in the individual components of the fuel cell electrode are also taken into account in the halide concentration of 50 to 1000 ppm. These may, for example, be halide ions which are precursors of the metal-containing catalyst or are introduced by the ionomer. However, the quantities of halide concentrations already contained in the individual components of the fuel cell electrode are negligibly small and are in particular below 20 ppm and in particular below 10 ppm. To achieve a halide concentration of 50 to 1000 ppm, at least one halide is thus actively added to the fuel cell electrode. The halide concentration in the fuel cell electrode relates to the halide concentration before use of the fuel cell electrode as intended.

The halide concentration can be set by adding a halide or by adding a combination of two or more halides. In this case, the halide is not restricted, in detail, and is in particular introduced into the fuel cell electrode as a dissolved salt. The determination of the halides in the fuel cell electrode takes place by ion chromatography. Ion chromatography makes it possible for the halides to be distinguished by their retention time (retention times: e.g. F: 6.9 min, Cl: 10.4 min, Br: 15.9 min). In this case, a mixture of 1.9 l of an aqueous solution of sodium carbonate with a concentration of 3.2 mmol/l, and sodium hydrogen carbonate with a concentration of 1.0 mmol/l and 0.1 l acetonitrile is used as the eluent, such that in total 2.0 l eluent results. The measurement is performed using a Metrohm 690 IC (Deutsche METROHM GmbH & Co. KG, Germany). As a column, the model Metrosep A Supp7—250/4.0 mm (Deutsche METROHM GmbH & Co. KG, Germany) is used. The temperature of the column is set to 40° C., the flow rate is 0.7 ml min 1. In the ion chromatography, depending on the sample preparation free ions can be measured, i.e. fluorine, which is covalently bonded, for example, in the polymer, is not detected. For this purpose, the halides are extracted e.g. by water. If the concentration of halides is determined, which is otherwise in one of the components of the fuel cell electrode, the sample can also be incinerated and then measured. To determine chloride ions, the sample preparation can take place via what is known as oxygen pressure digestion. In this method, the sample material is combusted under pressure and with addition of oxygen, in a closed system and thus the analytes covalently bonded in the material are also released and determined by ion chromatography. Since chloride ions are typically not contained in any of the components in the bound state, the chloride ion concentration of free chloride ions also corresponds to the chloride ion concentration in the entire fuel cell electrode.

Since, when used as intended in a fuel cell, the fuel cell electrode is in particular used with a second fuel cell electrode and a membrane arranged between the two fuel cell electrodes, it is preferred for only our fuel cell electrode to comprise an addition of halide(s), such that the halide concentration of this fuel cell electrode is 150 to 6000 ppm, and no further halides are added to the second fuel cell electrode or to the membrane.

We surprisingly found that the long-term stability of the fuel cell electrode can be improved, and thus a degradation of the metal-containing catalyst can be prevented, by a halide concentration of 150 to 6000 ppm based on the total mass of the fuel cell electrode. In this case, the halide concentration does not reduce the performance of fuel cell electrode used in the intended use.

In the light of a balance between long-term stability and performance of the fuel cell electrode, the fuel cell electrode preferably has a halide concentration of 300 to 3000 ppm based on the total mass of the fuel cell electrode.

As already disclosed above, the halide used is substantially not limited. The halide is advantageously selected from the group consisting of fluoride, chloride, bromide, iodide and mixtures thereof, and, on account of the very good availability and processability and also on account of its very small health-damaging effect, is preferably chloride.

According to an advantageous development, the metal-containing catalyst comprises a noble metal, or mixtures or alloys of two or more noble metals, or a noble metal/non-noble metal alloy. Non-noble metal alloys are suitable in particular for fuel cell electrodes configured as cathodes, and pure noble metal catalysts are suitable in particular for fuel cell electrodes configured as anodes.

In this case, it is preferred for the noble metal/non-noble metal alloy to comprise a platinum alloy, and/or for the noble metal of the metal-containing catalyst to comprise platinum and/or palladium.

Since degradation due to potential cycles of the metal-containing catalysts is visible in particular on the cathode side of a fuel cell, the fuel cell electrode is preferably configured as a cathode.

Furthermore, a catalyst-coated membrane is also described, which comprises a fuel cell electrode as described above. By using the fuel cell electrode, the catalyst-coated membrane (in the following: CCM) is also characterised by a very good long-term stability with a consistently good performance. Thus, the same advantageous effects result for the CCM as described above for the fuel cell electrode. These advantageous effects are due to the halide concentration of 150 to 6000 ppm in the fuel cell electrode used.

Furthermore, a method for producing the fuel cell electrode disclosed above is also described. In a method step of the method, a halide concentration is added to the fuel cell electrode, in such a way that the halide concentration of the fuel cell electrode is 150 to 6000 ppm and preferably 300 to 3000 ppm, based on the total mass of the fuel cell electrode. In this case, adding a halide concentration means that the halide is added in particular in the form of a soluble salt, and not already with the other fuel cell electrode elements, i.e. in particular the ionomer and the metal-containing catalyst. The halide or halides are added separately, and thus independently of the remaining fuel cell electrode elements.

Adding one or more halides makes it possible for a fuel cell having high long-term stability to be produced, which fuel cell does not cause any performance deterioration. In this case, the method can be implemented without requiring significant technical outlay and time.

According to an advantageous development, the addition of the halide concentration is carried out in such a way that the fuel cell electrode is produced with a solution that contains at least one halide. The production with a halide-containing solution makes it possible for a very uniform distribution of the halide in the fuel cell electrode to be performed, such that the fuel cell electrode is equally well protected against degradation in every catalytically active region, and thus also no performance losses are recorded in the case of use as intended.

The fuel cell electrode can be produced as an anode or as a cathode. The anode or cathode is in particular produced from an anode dispersion or a cathode dispersion. In this case, a halide-containing compound is added to the anode dispersion or the cathode dispersion, and specifically such that the halide weight portion $F_A$ in the anode dispersion fulfils the following formula:

$$F_A = (A \times B)$$

In the above formula, A is 150 to 6000 ppm and preferably 300 to 3000 ppm, and B is the solids content of the anode dispersion.

Alternatively, the halide weight portion $F_K$ in the cathode dispersion fulfils the following formula:

$$F_K = (A \times B)$$

wherein A is 150 to 6000 ppm and preferably 300 to 3000 ppm, and B is the solids content of the cathode dispersion.

As already disclosed above, the halide is preferably selected from the group consisting of fluoride, chloride, bromide, iodide and mixtures thereof, and, on account of the very good availability and also on account small health-damaging effect, is preferably chloride.

According to an advantageous development, a cation of a halide-containing compound used for creating the required halide concentration is selected from the group of protons, alkali metals, alkaline earth metals, an ammonium ion, or cationic organic compounds. Particularly preferred cations are Na and K.

For further simplification of the method, for producing the fuel cell electrode a fuel cell electrode dispersion is prepared, in that a metal-containing catalyst and a proton-conducting ionomer are dispersed, and a halide-containing compound is added to the fuel cell electrode dispersion before, during or after the dispersing. In this case, adding of the halide-containing compound is carried out in particular with further dispersion, to bring about a uniform distribution of the halide or halides.

The method can be used for producing the fuel cell electrode. According thereto, a fuel cell electrode produced according to the method set out above is also described, which is characterised by high long-term stability and at the same time no performance losses.

Furthermore, a catalyst-coated membrane is also described, which comprises a cathode, an anode, and a proton-conducting membrane located therebetween, wherein the cathode comprises a first metal-containing catalyst and a proton-conducting ionomer, wherein the anode comprises a second metal-containing catalyst and a proton-conducting ionomer, and wherein the membrane comprises a proton-conducting ionomer.

A catalyst-coated membrane is understood to mean any arrangement in which an anode and a cathode surround both sides of a membrane, such that the membrane is arranged between the cathode and the anode. In this case, the anode and the cathode can be coated directly onto the membrane and form a compound. In this case, reference is made in particular to a CCM, i.e. a "catalyst-coated membrane". Furthermore, a catalyst-coated membrane is also understood to mean an arrangement for use in a fuel cell, in which the anode and the cathode are arranged, and in particular laminated, on two sides of a membrane. In both cases, the two exposed sides of the anode and the cathode can be provided with a gas diffusion layer (GDL). If gas diffusion layers are provided, reference is also made, in the case of the overall assembly, to membrane electrode assemblies (MEA). In the case of the catalyst-coated membrane the halide concentration refers to an assembly as configured above, without a GDL.

The catalyst-coated membrane has a halide concentration of 50 to 1000 ppm, based on the total mass of the catalyst-coated membrane. The halide concentration thus results from the sum of the individual halide concentrations of the anode, the cathode and the membrane, and refers to the total mass of these components. In this case, the concentration of halide of 50 to 1000 ppm is substantially not introduced by the metal-containing catalyst(s) and the ionomers, but rather is explicitly added, until the desired halide concentration has been set. The halide concentration in the catalyst-coated membrane is, as already described above for the fuel cell electrode, determined by ion chromatography. By the selected sample preparation method, or the selection of the halide(s) to be determined, only free halides are detected, and not covalently or otherwise (e.g. complexly) bonded halides, in the catalyst-coated membrane. Fluorides, which are present in a bound state, for example, in the ionomer (e.g. when using fluorinated ionomers) or in the membrane, are explicitly not also acquired by aqueous extraction and subsequent measurement by ion chromatography.

The halide(s) is/are preferably present mainly in the cathode, since the cathode is particularly susceptible to degradation of the catalyst. However, since halide ions can sometimes move through the layers of the catalyst-coated membrane, the desired halide concentration can also be set in the anode or even in the membrane. In the case of use of the catalyst-coated membrane as intended, the effect with respect to the long-term stability of the catalyst-coated membrane results in that the halide(s) are distributed uniformly in the layers, and thus have a uniformly stabilising effect without reducing the performance of the catalyst-coated membrane.

The halide concentration of 50 to 1000 ppm, which relates to the total mass of the catalyst-coated membrane, is present both in an unused (i.e. newly manufactured) catalyst-coated membrane and also in a catalyst-coated membrane during or after use as intended. This is due to the fact that the halide(s) can be added to the anode and/or to the cathode and/or to the membrane in a desired concentration, such that overall, based on the total mass of the catalyst-coated membrane, the halide concentration of 50 to 1000 ppm is set. Even if, e.g. during use as intended, halides migrate from their original component into other components of the catalyst-coated membrane (for example, from the cathode to the anode, or from the anode to the cathode, or from the cathode to the membrane and/or the anode, or from the anode to the membrane and/or the cathode), the halide concentration based on the total mass of the catalyst-coated membrane always remains the same, specifically, 50 to 1000 ppm.

This is consistent with the fuel cell electrode, described above, If this fuel cell electrode, which has a halide concentration of 50 to 1000 ppm, is used for the catalyst-coated membrane, then, provided that the halide concentration in the fuel cell electrode used is at least 50 ppm but below 1000 ppm, then one or more halides can also be added to the further fuel cell electrode and/or the membrane, such that overall, based on the total mass of the catalyst-coated membrane, a total halide concentration of the catalyst-coated membrane of 50 to 1000 ppm results.

It is also possible for the fuel cell electrode according to this disclosure having a halide concentration of less than 1000 ppm to be combined, in the catalyst-coated membrane, with a fuel cell electrode not according to this disclosure which has e.g. a halide concentration of less than 50 ppm, based on the total mass of the fuel cell electrode, provided the halide concentration of the catalyst-coated membrane, based on the total mass of the catalyst-coated membrane is 50 to 1000 ppm.

It is also possible for two fuel cell electrodes not according to this disclosure, both having e.g. in each case a halide concentration of less than 50 ppm, based on the respective total mass of the corresponding fuel cell electrode, to be combined to form a catalyst-coated membrane according to this disclosure, specifically if, based on the total mass of the catalyst-coated membrane, a halide concentration of 50 to 1000 ppm results.

However, preferably the desired halide concentration of 50 to 1000 ppm, based on the total mass of the catalyst-coated membrane, is introduced via the fuel cell, in particular via the cathode, such that the halide concentration of the fuel cell, which, in the fuel cell, refers to the total mass of the fuel cell, is reflected in the halide concentration of the catalyst-coated membrane, which refers to the total mass of the catalyst-coated membrane. However, the distribution of the halide(s) in the individual layers of the catalyst-coated membrane, when this is used as intended, can vary without changing the halide concentration, based on the total mass of the catalyst-coated membrane.

For an improved balance between the effects of the improvement of the long-term stability with simultaneously high performance, the halide concentration in the catalyst-coated membrane is preferably 50 to 500 ppm, based on the total mass of the catalyst-coated membrane.

As already disclosed above, the halide used is substantially not limited. However, the halide is advantageously selected from the group consisting of fluoride, chloride, bromide, iodide and mixtures thereof, and, on account of the very good availability and also on account small health-damaging effect, is preferably chloride.

According to an advantageous development, the first and the second metal-containing catalyst comprise a noble metal, or mixtures or alloys of two or more noble metals, or a noble metal/non-noble metal alloy.

In this case, it is preferred for the noble metal/non-noble metal alloy to comprise a platinum alloy, and/or for the noble metal of the metal-containing catalyst to comprise platinum and/or palladium.

According to a further development, the anode of the catalyst-coated membrane has a halide weight portion $F_A$ corresponding to the following formula:

$$F_A = \left(A \times \frac{M_{CCM}}{M_{CLA}}\right)$$

In this case, A is 50 to 1000 ppm and preferably 50 to 500 ppm, $M_{CCM}$ is the areal weight of the catalyst-coated membrane, and $M_{CLA}$ is the areal weight of the anode.

Furthermore, the cathode of the catalyst-coated membrane preferably has a halide weight portion Fx corresponding to the following formula:

$$F_K = \left(A \times \frac{M_{CCM}}{M_{CLK}}\right)$$

In this case, A is 50 to 1000 ppm and preferably 50 to 500 ppm, $M_{CCM}$ is the areal weight of the catalyst-coated membrane, and $M_{CLK}$ is the areal weight of the cathode.

The above formulas are explained on the basis of the following examples, wherein, however, the examples serve only for illustration and do not restrict this disclosure. For example, depending on the type, the membrane thickness is 8 to 20 µm, such that an areal weight ($M_{CCM}$) of 1.6 to 4 mg/cm² results.

For a membrane having a membrane thickness of 12 µm, a membrane areal weight $M_{CCM}$ of 2.4 mg/cm² results.

The areal weight of the electrodes ($M_{CLA}$ or $M_{CLK}$) depends on a plurality of factors: Catalyst loading (e.g. Pt and/or Pd)

e.g. platinum content at the catalyst (typically 20 wt. %-60 wt. %)

Ionomer content (i.e. in particular ionomer to carbon ratio—I:C).

EXAMPLES

Anode with 0.1 mg (Pt)/cm², 20 wt. % Pt/C and I:C 0.8:1
→Areal weight ($M_{CLA}$)=0.82 mg/cm²
Cathode with 0.5 mg (PtCo)/cm², 50% Pt/C and I:C 1:1
→Areal weight ($M_{CLK}$)=1.5 mg/cm²
Total areal weight ($M_{CCM}$)=4.72 mg/cm²
Factor for anode ($F_A$)=5.76→$F_A$=288-5760 ppm
Factor for cathode ($F_K$)=3.15→$F_K$=157-3150 ppm Furthermore, a fuel cell having very good long-term stability with consistent good performance is also described. The fuel cell is characterised in that it comprises the catalyst-coated membrane described above, which results in the advantageous effects set out above, also for the fuel cell.

The advantages, advantageous effects and developments described in each case for the fuel cell electrode, the catalyst-coated membrane and the fuel cell are in each case used reciprocally.

Furthermore, a method for producing the catalyst-coated membrane as disclosed above is also described. According to the method, a halide concentration is added to the cathode and/or to the anode and/or to the proton-conducting membrane in such a way that the halide concentration of the catalyst-coated membrane is 50 to 1000 ppm, preferably 50 to 500 ppm, based on the total mass of the catalyst-coated membrane. The halide concentration is thus made up of the individual halide concentrations of the anode, the cathode and the membrane, and refers to the total mass of these elements/components.

The desired halide concentration is obtained by adding one or more halides. It therefore does not result already from using a halide-containing catalyst precursor and a halide-containing ionomer, but rather is explicitly added to the respective element(s) of the catalyst-coated membrane to be produced.

Owing to a halide concentration of 50 to 1000 ppm, and preferably 50 to 500 ppm, the long-term stability of the catalyst-coated membrane improves without performance losses having to be accepted. In this case, the method can be implemented easily without significant technical outlay, and is therefore very efficient.

The method for producing a catalyst-coated membrane is suitable for producing our catalyst-coated membrane.

To achieve a particularly uniform halide ion concentration in the catalyst-coated membrane, the catalyst-coated membrane is produced with a solution that contains at least one halide. The production by a solution containing a halide can take place in one or more or even in all the layers of the catalyst-coated membrane, provided the desired halide concentration, based on the total weight of the catalyst-coated membrane, is achieved. The production of the catalyst-coated membrane using a halide solution can be implemented in a technically particularly simple manner and does not require any significant technical outlay and allows for a particularly uniform distribution of the halide or of the halides in the corresponding layer.

According to an advantageous development, the anode is produced from an anode dispersion and the cathode is produced from a cathode dispersion, wherein a halide-containing compound is added to the anode dispersion and/or to the cathode dispersion, wherein the halide weight portion $F_A$ in the anode dispersion fulfils the following formula:

$$F_A = \left( A \times B \times \frac{M_{CCM}}{M_{CLA}} \right)$$

In this case, A is 50 to 1000 ppm and preferably 50 to 500 ppm, B is the solids content of the anode dispersion, $M_{CCM}$ is the areal weight of the catalyst-coated membrane, and $M_{CLA}$ is the areal weight of the anode.

Alternatively or in addition, the halide weight portion $F_K$ in the cathode dispersion fulfils the following formula:

$$F_K = \left( A \times B \times \frac{M_{CCM}}{M_{CLK}} \right)$$

In this case, A is 50 to 1000 ppm and preferably 50 to 500 ppm, B is the solids content of the cathode dispersion, $M_{CCM}$ is the areal weight of the catalyst-coated membrane, and $M_{CLK}$ is the areal weight of the cathode.

In this case, the anode dispersion and the cathode dispersion can have different halide weight portions.

The halide is also substantially not limited and can be selected from fluoride, chloride, bromide or iodide, wherein chloride is particularly preferred as the halide.

Owing to the good solubility, the cation of a halide-containing compound used for setting the halide concentration is selected from the groups of protons, alkali metals, alkaline earth metals, an ammonium ion, or cationic organic compounds. Particularly preferred cations are $Na^+$ and $K^+$.

For further simplification of the method, the anode dispersion and the cathode dispersion are coated directly onto the membrane or onto the membrane via a decal substrate.

According to a further advantageous development, to produce the cathode a cathode dispersion is prepared, in that a first metal-containing catalyst and a proton-conducting ionomer are dispersed. Further advantageously, to produce the anode an anode dispersion is prepared, in that a second metal-containing catalyst and a proton-conducting ionomer are dispersed. Furthermore, a halide-containing compound is added to the cathode dispersion and/or the anode dispersion before, during or after the dispersion, such that the desired halide ion concentration can be set.

The dispersion can be carried out using typical technical auxiliaries, and, on account of the usually very good solubility of the halide-containing compound, can be implemented easily, in technical terms, and quickly.

In the following, method steps for producing a catalyst-coated membrane are set out, by way of example. Further method steps may be provided.

Preparation of a Catalyst Dispersion

A catalyst dispersion (also referred to as fuel cell electrode dispersion) is prepared by mixing a metal-containing catalyst in water, solvent and an ionomer dispersion. The ionomers used in the catalyst layers are not restricted in detail, and can be perfluorinated ionomers (PFSA), partially fluorinated or hydrocarbon-based (non-fluorinated) ionomers. The catalyst dispersion is ground in a ball mill (grinding medium: $ZrO_2$ balls) for approximately 120 minutes. A catalyst layer is produced by applying and drying the catalyst dispersion on an inert substrate, known as a decal.

Alternatively, for example, ultrasound or different grinding medium mills may also be used in the preparation of the dispersion. Grinding medium mills include e.g. ball mills, agitator bead mills, agitator mills, attritor mills, and specific rolling mills.

To prepare a catalyst dispersion having a lower chloride concentration, the required amount of a 5 mass. % aqueous sodium chloride solution is added to the catalyst ink after the above dispersion process, and subsequently stirred in a magnetic stirrer for at least two hours. To set higher chloride concentrations, the required amount of a 20 mass. % aqueous sodium chloride solution is added to the catalyst ink after the dispersion process, and subsequently stirred in a magnetic stirrer for at least two hours.

Production of the Catalyst-Coated Membrane

Cathode and anode layers consisting of the correspondingly prepared anode dispersion and cathode dispersion can be coated and dried on an inert film. Conventional technologies such as slit dies, doctor blades, spiral applicators, screen printing or also spraying devices are possible as a coating. The layers are subsequently transferred to the membrane in a lamination process (known as decal process), wherein the lamination temperature is typically 150 to 190° C., and a pressure of 1 to 3 MPa is applied. The lamination can take place, for example, in a press, or continuously between a roller pair. The lamination duration in a press in non-continuous operation is approximately one minute and can, for a continuous method, also be only a few seconds.

In an alternative method, the cathode and/or the anode can also be applied directly to the membrane and dried (direct printing method).

As a further alternative, the cathode and/or the anode can also be applied to a gas diffusion layer (GDL) and dried, to obtain what is known as a gas diffusion electrode (GDE) which is subsequently brought into contact with the membrane to obtain a membrane electrode assembly (GDE method).

As a further alternative, a first electrode can be applied to the membrane (via a decal method or also via a direct printing method) and a second electrode can be applied to a GDL.

Within the scope of this disclosure, the different methods for producing the membrane electrode assembly are to be considered equivalent.

The method for producing a catalyst-coated membrane can be used for producing our catalyst-coated membrane. According thereto, a catalyst-coated membrane produced according to the method set out above is also described, which is characterised by high long-term stability and at the same time no performance losses.

EXAMPLES

Our electrodes, membranes, fuel cells, and methods are explained in greater detail in the following, with reference to the examples and figures presented.

Only the essential elements and components are shown in the figures. For the sake of clarity, all the remaining elements and components are omitted.

FIG. 1 is a schematic cross section of a catalyst-coated membrane 1 according to an embodiment. The catalyst-coated membrane 1 comprises a cathode 2, an anode 3, and a proton-conducting membrane 4 located therebetween, wherein the cathode 2 comprises a first metal-containing catalyst 5 and a proton-conducting ionomer 6, the anode 3 comprises a second metal-containing catalyst 7 and a proton-conducting ionomer 8, and the membrane 4 comprises a proton-conducting ionomer. The catalyst-coated membrane 1 has a halide concentration of 50 to 1000 ppm, based on the total mass of the catalyst-coated membrane 1. The halide 9 is in particular chloride, and is explicitly arranged, here, in the cathode 2. Particularly preferably, the halide 9 is introduced into the cathode 3 in the form of an NaCl solution.

On account of the halide concentration, the catalyst-coated membrane 1 is characterised by very good long-term stability with no significant performance loss.

Potential Cycle Test

The potential cycle test constitutes an accelerated stability test, which simulates the voltage course of the cathode during dynamic operation of a fuel cell, i.e. under normal operating conditions, wherein a power of the fuel cell is called up.

The potential cycle test corresponds to the recommendations of the US Department of Energy (DOE) and was carried out as follows:

The temperature of the individual cell $T_{Zelle}$ was 80° C., and the humidifier temperatures were 80° C. for the anode and 80° C. for the cathode. Hydrogen was conducted onto the anode, and nitrogen was conducted onto the cathode, under ambient pressure. A square-wave voltage was applied to the cell, wherein a voltage of 0.6 V for 3 s and a voltage of 0.95 V for 3 s alternated. This cycle was repeated 30,000 times.

Chemical Long-Term Stability Test

The chemical long-term stability test is an accelerated stability test which tests the crossing of the catalyst-coated membrane by the hydrogen during operation under open circuit voltage.

The chemical long-term stability test corresponds to the recommendations of the US Department of Energy (DOE) and was carried out as follows:

The temperature of the cell $T_{Zelle}$ was 90° C., and the humidification was set to 30% RH. Air was conducted onto the anode and onto the cathode, under 1.5 bar. No current was obtained, and therefore the cell was present under open circuit voltage. The hydrogen crossing was measured at regular intervals.

Ion Chromatography for Determining the Halide Content

The sample preparation prior to determining the halide content, in particular of chloride, by ion chromatography, took place under oxygen pressure digestion. In this case, the sample material was combusted under pressure and with addition of oxygen, in a closed system.

The determination of the halides in the fuel cell electrode took place by ion chromatography. Ion chromatography makes it possible for the halides to be distinguished by their retention time (retention times: e.g. F: 6.9 min, Cl: 10.4 min, Br: 15.9 min). In this case, a mixture of 1.9 l of an aqueous solution of sodium carbonate with a concentration of 3.2 mmol/l, and sodium hydrogen carbonate with a concentration of 1.0 mmol/l and 0.1 l acetonitrile was used as the eluent, such that in total 2.0 l eluent resulted. The measurement was performed using the instrument Metrohm 690 IC (Deutsche METROHM GmbH & Co. KG, Germany). As a column, the model Metrosep A Supp7-250/4.0 mm (Deutsche METROHM GmbH & Co. KG, Germany) was used. The temperature of the column was set to 40° C., the flow rate was 0.7 ml min 1 Example 1

A catalyst-coated membrane was produced as described above. The cathode produced according to Example 1 comprises, as the catalyst, a pure platinum catalyst supported on carbon (50 mass % platinum, 50 mass % carbon). The noble metal areal weight of the metal-containing catalyst was 0.4 $mg_{Pt}/cm^2$. The cathode further comprised an ionomer having an equivalent weight (EW) of 790 g/mol (Aquivion® D79-25BS; Solvay Specialty Polymers, Italy). The mass ratio of ionomer to carbon-containing support material was 0.8:1.

The cathode according to Example 1 furthermore comprised sodium chloride in a concentration of 1370 to 1500 ppm chloride, which was determined by ion chromatography, as described above.

The anode produced according to Example 1 comprised, as the catalyst, a pure platinum catalyst supported on carbon (20 mass % platinum, 80 mass % carbon). The noble metal areal weight of the metal-containing catalyst was 0.1 $mg_{Pt}/cm^2$. The anode further comprised an ionomer having an equivalent weight (EW) of 790 g/mol (Aquivion® D79-25BS; Solvay Specialty Polymers, Italy). The mass ratio of ionomer to carbon-containing support material was 0.8:1.

The MEA produced according to Example 1 was produced according to the decal method described above. The anode and cathode were each applied to a glass fibre-reinforced PTFE substrate, using a spiral applicator. The wet layer thickness was selected such that the target loading was achieved. The respective catalyst dispersion was subsequently dried in an oven at 100° C. for 5 min. The lamination (decal transfer) of the anode and cathode with the membrane (perfluorinated reinforced sulfonic acid membrane, 15 µm thickness) took place in a band laminator at a temperature of 180° C. and a pressure of 1 MPa for 1 min.

The chloride content of the catalyst-coated membrane was therefore 310 to 340 ppm chloride.

Examples 2 and 3, Comparative Examples 1 to 3

Examples 2 and 3, and Comparative Examples 1 to 3, were produced analogously to Example 1, but with the compositions as set out in Table 1.

Table 1 gives an overview of the tests carried out and the respective test results. This shows examples and comparative examples, their respective chloride content, and losses from the potential cycle test between 0.6 and 0.95 V. (Values at the start of the test, minus the values after completion of the test).

TABLE 1

| Example | Chloride content (theoretical) ppm | Chloride content (measured) ppm | Catalyst | Membrane | Voltage loss | Mass activity loss A/mg(Pt) | EPSA loss $cm^2(Pt)/cm^2(geo)$ |
|---|---|---|---|---|---|---|---|
| Example 1 | 513 | 310-340 | Pt on graphitised carbon black | PFSA | 60 | 0.0325 | 54.7 |
| Comparative example 1 | 0 | not measured | Pt on graphitised carbon black | PFSA | 111 | 0.074 | 96.1 |

TABLE 1-continued

| Example | Chloride content (theoretical) ppm | Chloride content (measured) ppm | Catalyst | Membrane | Voltage loss | Mass activity loss A/mg(Pt) | EPSA loss $cm^2(Pt)/cm^2(geo)$ |
|---|---|---|---|---|---|---|---|
| Example 2 | 505-521 | 200-220 | Pt on non-graphitised carbon | PFSA | 4.5 | 0.0445 | 122 |
| Comparative example 2 | 0 | <50* (* below detection limit) | Pt on non-graphitised carbon | PFSA | 15.5 | 0.061 | 167 |
| Example 3 | 791-826 | 120-160 | Pt on non-graphitised carbon | HC | 18.5 | 0.0445 | 122 |
| Comparative example 3 | 0 | <50* (* below detection limit) | Pt on non-graphitised carbon | HC | 26 | 0.0505 | 157 |

For example, carbons of the trademark VULCAN by the company Cabot can be used as non-graphitised carbon. In this case, "EPSA" means effective platinum surface area. The term "geo" refers to the geometric active surface area of the catalyst-coated membrane. Thus, the EPSA specifies the surface area of the platinum [$cm^2$ (Pt)] per area of the catalyst-coated membrane.

Figure 2:
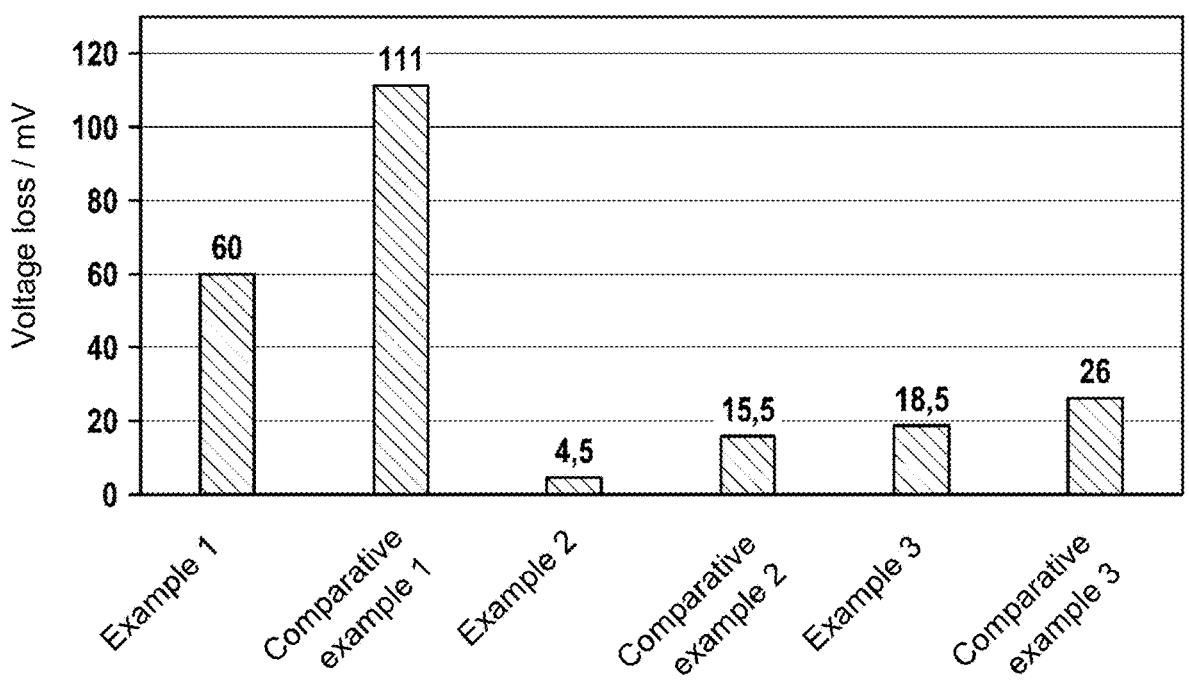
FIG. 2 shows voltage losses of the examples after 30000 potential cycles between 0.6 to 0.95 V.
Figure 3:
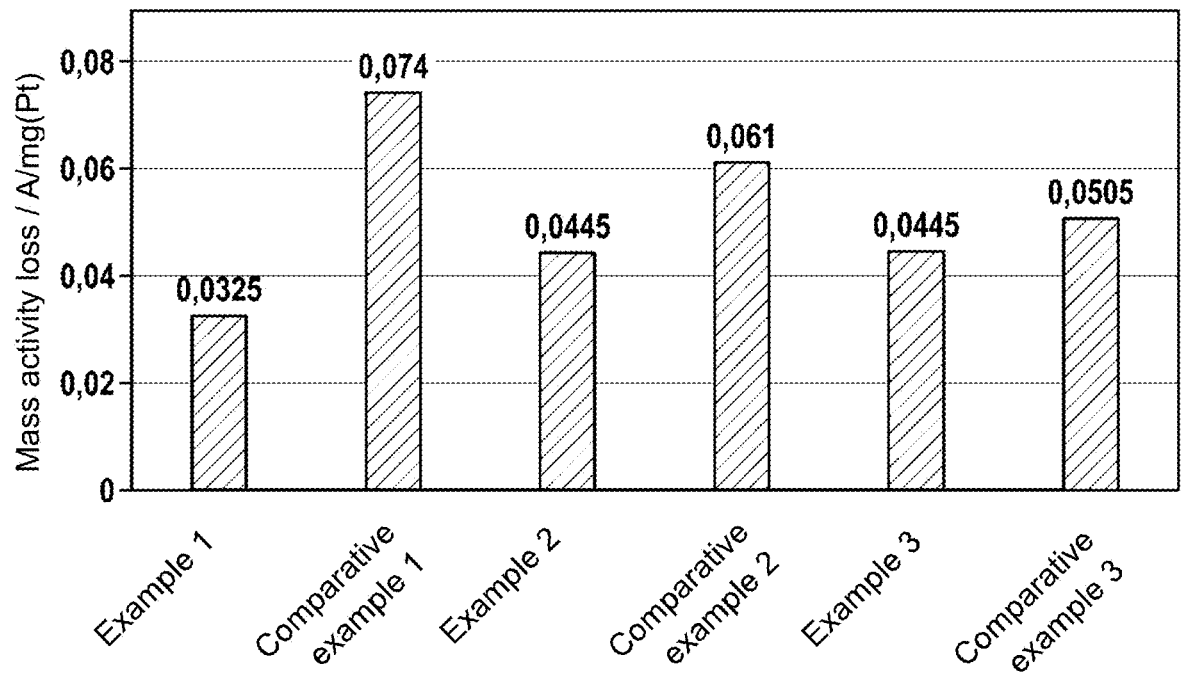
FIG. 3 shows mass activity losses of the examples after 30000 potential cycles between 0.6 to 0.95 V.
Figure 4:
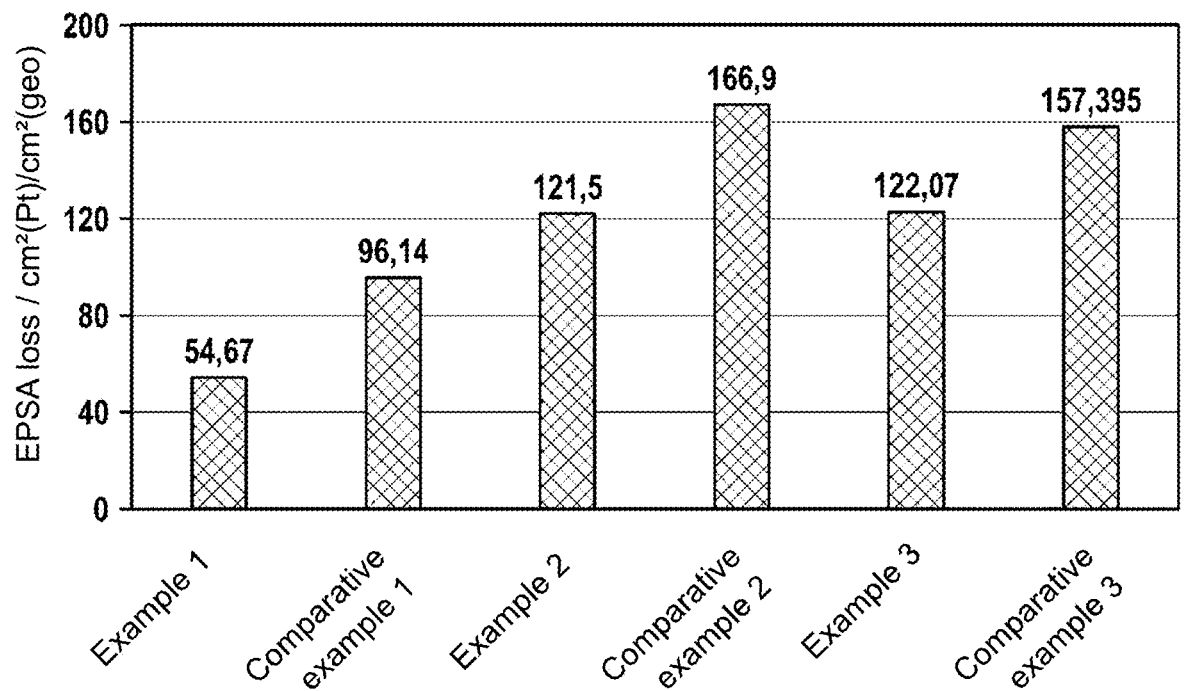
FIG. 4 shows EPSA losses (catalyst surface) after 30000 potential cycles between 0.6 to 0.95 V.

As shown in FIGS. 1 to 3, on account of the set chloride ion concentration of 50 to 1000 ppm the examples exhibit very much lower voltage losses after 30,000 potential cycles between 0.6 to 0.95 V (see FIG. 2), lower mass activity losses after 30,000 potential cycles between 0.6 to 0.95 V (see FIG. 3), and lower EPSA losses (effective platinum surface area-platinum surface area based on the area of the electrode; i.e. EPSA specifies the surface area of the platinum [$cm^2$(Pt)] per area of the catalyst-coated membrane) after 30,000 potential cycles between 0.6 to 0.95 V (see FIG. 4) compared with the comparative examples without addition of halides.

Figure 5:
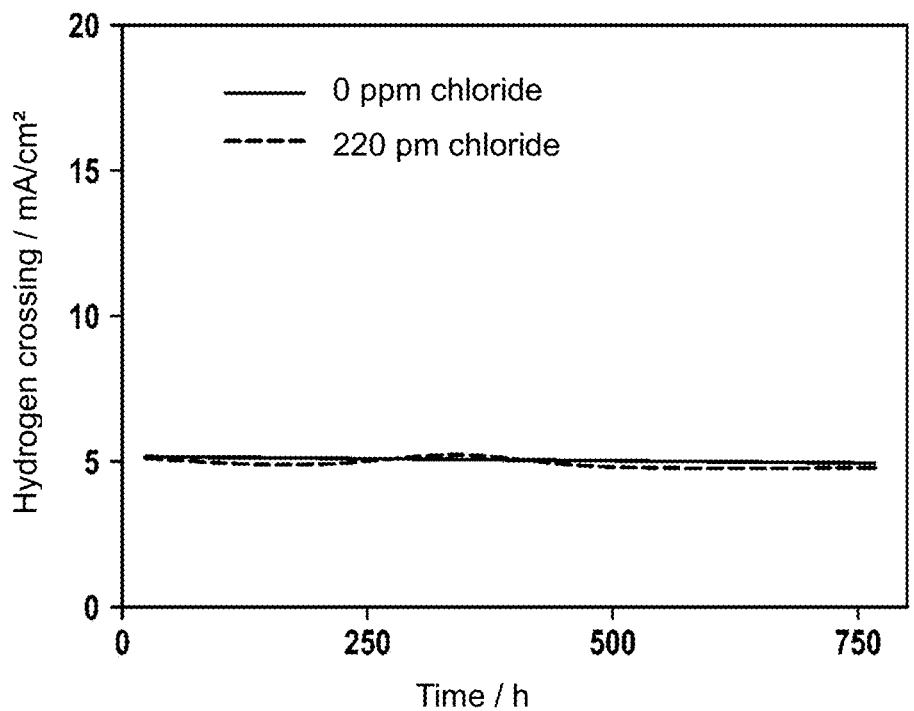
FIG. 5 shows chemical long-term stabilities of a sample without chloride (solid line) and a sample having a measured value of 220 ppm chloride (dashed line).

Chloride in the ppm range used leads to a reduction in the voltage loss, a reduction in the mass activity loss, and also in the EPSA loss. Furthermore, no negative influence on the chemical long-term stability is observed, which can be seen in particular from FIG. 5. No influence of increased $H_2O_2$ concentration was observed.

Figure 6:
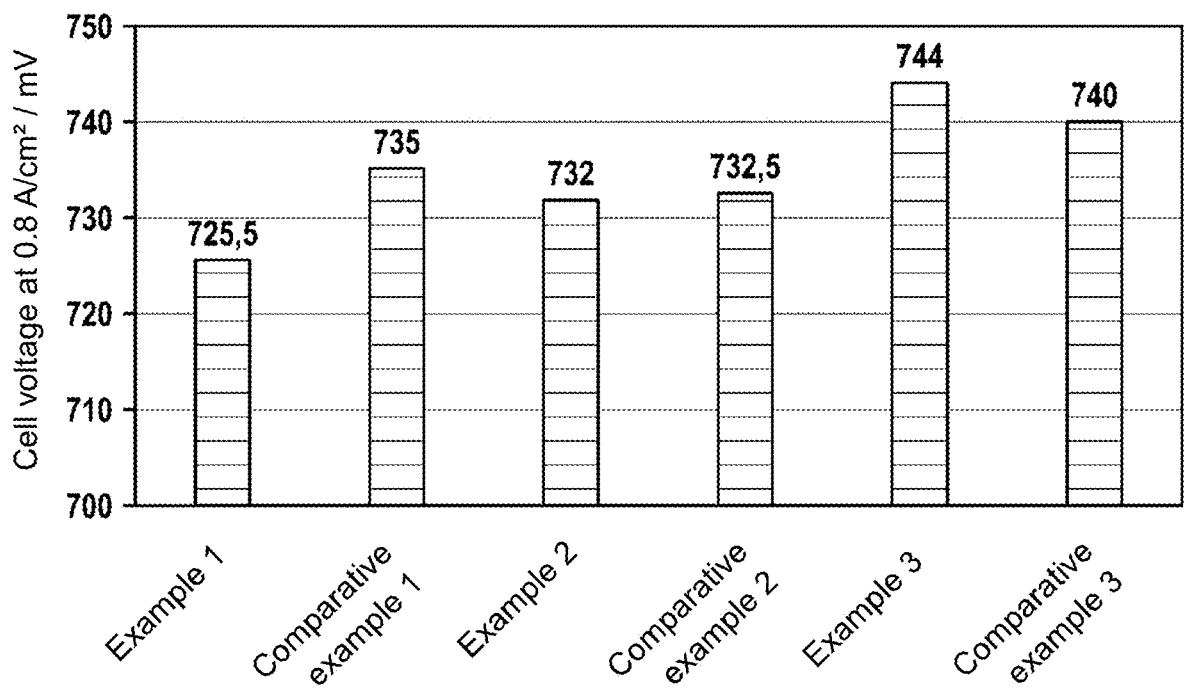
FIG. 6 shows cell voltages of the examples at 0.8 A/cm$^2$ at the start of the measurements.

FIG. 6 shows that the chloride content does not have any significant influence on the cell voltage, i.e. there is no impairment of the cell voltage.

In addition to the above disclosure, for the additional disclosure thereof reference is hereby explicitly made to the illustrations in FIGS. 1 to 6.

What is claimed is:

1. A fuel cell electrode comprising a metal-containing catalyst and a proton-conducting ionomer, wherein the fuel cell electrode has a halide concentration of 150 to 6000 ppm, based on the total mass of the fuel cell electrode.

2. The fuel cell electrode according to claim 1, wherein the fuel cell electrode has a halide concentration of 300 to 3000 ppm, based on the total mass of the fuel cell electrode, and/or
wherein the halide is selected from the group consisting of fluoride, chloride, bromide, iodide and mixtures thereof.

3. The fuel cell electrode according to claim 1, wherein the metal-containing catalyst comprises a noble metal, or mixtures or alloys of two or more noble metals, or a noble metal/non-noble metal alloy.

4. The fuel cell electrode according to claim 1, configured as a cathode.

5. A catalyst-coated membrane, comprising a fuel cell electrode according to claim 1.

6. A method for producing the fuel cell electrode according to claim 1, wherein a halide concentration is added to the fuel cell electrode in such a way that the halide concentration of the fuel cell electrode is 150 to 6000 ppm, based on the total mass of the fuel cell electrode.

7. The method according to claim 6, wherein the fuel cell electrode is produced with a solution that contains at least one halide.

8. The method according to claim 6, wherein the fuel cell electrode is produced as an anode from an anode dispersion, or as a cathode from a cathode dispersion, and a halide-containing compound is added to the anode dispersion or the cathode dispersion,
the halide weight portion $F_A$ in the anode dispersion fulfils the following formula:

$$F_A = (A \times B)$$

wherein A is 150 to 6000 ppm, and B is the solids content of the anode dispersion, or
the halide weight portion Fx in the cathode dispersion fulfils the following formula:

$$F_K = (A \times B)$$

wherein A is 150 to 6000 ppm, and B is the solids content of the cathode dispersion,
the anode dispersion and the cathode dispersion can have different halide weight portions, and/or
a cation of a halide-containing compound is selected from the group of protons, alkali metals, alkaline earth metals, an ammonium ion, or cationic organic compounds, and/or
for producing the fuel cell electrode a fuel cell electrode dispersion is prepared, in that a metal-containing catalyst and a proton-conducting ionomer are dispersed, and a halide-containing compound is added to the fuel cell electrode dispersion before, during or after the dispersing.

9. A catalyst-coated membrane comprising a cathode, an anode, and a proton-conducting membrane located therebetween, wherein
a. the cathode comprises a first metal-containing catalyst and a proton-conducting ionomer,
b. the anode comprises a second metal-containing catalyst and a proton-conducting ionomer, and c. the membrane comprises a proton-conducting ionomer, and the catalyst-coated membrane has a halide concentration of 50 to 1000 ppm, based on the total mass of the catalyst-coated membrane.

10. The catalyst-coated membrane according to claim 9, wherein the catalyst-coated membrane has a halide concentration of 50 to 500 ppm, based on the total mass of the catalyst-coated membrane, and/or the halide is selected from the group consisting of fluoride, chloride, bromide, iodide and mixtures thereof, and/or the first metal-containing catalyst and the second metal-containing catalyst comprises a noble metal, or mixtures or alloys of two or more noble metals, or a noble metal/non-noble metal alloy.

11. A catalyst-coated membrane according to claim 9, wherein the anode has a halide weight portion $F_A$ corresponding to the following formula:

$$F_A = \left(A \times \frac{M_{CCM}}{M_{CLA}}\right)$$

wherein A is 50 to 1000 ppm, and $M_{CCM}$ is the areal weight of the catalyst-coated membrane, and $M_{CLA}$ is the areal weight of the anode, or the cathode has a halide weight portion $F_K$ corresponding to the following formula:

$$F_K = \left(A \times \frac{M_{CCM}}{M_{CLK}}\right)$$

wherein A is 50 to 1000 ppm, and $M_{CCM}$ is the areal weight of the catalyst-coated membrane, and $M_{CLK}$ is the areal weight of the cathode.

12. A fuel cell comprising a catalyst-coated membrane according to claim 9.

13. A method for producing the catalyst-coated membrane according to claim 9, wherein a halide concentration is added to the cathode and/or to the anode and/or to the proton-conducting membrane in such a way that the halide concentration of the catalyst-coated membrane is 50-1000 ppm, based on the total mass of the catalyst-coated membrane.

14. The method according to claim 13, wherein the catalyst-coated membrane is produced with a solution that contains at least one halide, and/or the anode is produced from an anode dispersion and the cathode is produced from a cathode dispersion, and a halide-containing compound is added to the anode dispersion and/or to the cathode dispersion, the halide weight portion $F_A$ in the anode dispersion fulfils the following formula:

$$F_A = \left(A \times B \times \frac{M_{CCM}}{M_{CLA}}\right)$$

wherein A is 50 to 1000 ppm, B is the solids content of the anode dispersion, and $M_{CCM}$ is the areal weight of the catalyst-coated membrane, and $M_{CLA}$ is the areal weight of the anode, and/or the halide weight portion $F_K$ in the cathode dispersion fulfils the following formula:

$$F_K = \left(A \times B \times \frac{M_{CCM}}{M_{CLK}}\right)$$

wherein A is 50 to 1000 ppm, B is the solids content of the cathode dispersion, and $M_{CCM}$ is the areal weight of the catalyst-coated membrane, and $M_{CLK}$ is the areal weight of the cathode, the anode dispersion and the cathode dispersion can have different halide weight portions, and/or a cation of a halide-containing compound is selected from the group of protons, alkali metals, alkaline earth metals, an ammonium ion, or cationic organic compounds, and/or an anode dispersion and a cathode dispersion are coated directly onto the membrane or are coated onto the membrane via a decal substrate, and/or for producing the cathode a cathode dispersion is prepared, in that a first metal-containing catalyst and a proton-conducting ionomer are dispersed, for producing the anode an anode dispersion is prepared, in that a second metal-containing catalyst and a proton-conducting ionomer are dispersed, and a halide-containing compound is added to the cathode dispersion and/or to the anode dispersion before, during or after the dispersing.

15. The fuel cell electrode according to claim 1, wherein the metal-containing catalyst comprises a noble metal, or mixtures or alloys of two or more noble metals, or a noble metal/non-noble metal alloy, wherein the noble metal/non-noble metal alloy comprises a platinum alloy, and/or the noble metal of the metal-containing catalyst comprises platinum and/or palladium.

16. The method for producing the fuel cell electrode according to claim 1, wherein a halide concentration is added to the fuel cell electrode in such a way that the halide concentration of the fuel cell electrode is 300 to 3000 ppm, based on the total mass of the fuel cell electrode.

17. The method for producing the fuel cell electrode according to claim 8, wherein A is 300 to 3000 ppm.

18. The catalyst-coated membrane according to claim 10, wherein the noble metal/non-noble metal alloy comprises a platinum alloy, and/or wherein the noble metal of the second metal-containing catalyst comprises platinum and/or palladium.

19. The catalyst-coated membrane according to claim 11, wherein A is 50-500 ppm.

20. The method according to claim 14, wherein A is 50-500 ppm.

\* \* \* \* \*